United States Patent [19]
Mahone

[11] Patent Number: 5,791,467
[45] Date of Patent: Aug. 11, 1998

[54] COMPACT DISK COVER

[76] Inventor: James Stephen Mahone, P.O. Box 172766, Arlington, Tex. 76003

[21] Appl. No.: 769,157
[22] Filed: Dec. 18, 1996
[51] Int. Cl.$^6$ .................................................. B65D 85/57
[52] U.S. Cl. ................................. 206/308.1; 206/312
[58] Field of Search .......................... 206/303, 308.1, 206/309, 311, 312, 313, 307; 150/154

[56] References Cited

U.S. PATENT DOCUMENTS

| | | | |
|---|---|---|---|
| 1,498,577 | 6/1924 | Reinhold. | |
| 2,151,486 | 3/1939 | Ramel et al. | 206/303 |
| 2,555,594 | 6/1951 | Markovitz. | |
| 3,317,038 | 5/1967 | Bade et al. | |
| 4,387,807 | 6/1983 | de la Rosa. | |
| 4,736,840 | 4/1988 | Deiglmeier. | |
| 4,762,225 | 8/1988 | Henkel | 206/311 |
| 4,971,195 | 11/1990 | Mitsuyama | 206/311 |

FOREIGN PATENT DOCUMENTS

| | | | |
|---|---|---|---|
| 2440597 | 7/1980 | France. | |
| 113663 | 12/1968 | United Kingdom | 206/313 |
| 2239446 | 7/1991 | United Kingdom. | |

Primary Examiner—Bryon P. Gehman
Attorney, Agent, or Firm—Stephen R. Greiner

[57] ABSTRACT

A protective cover for an optical disk such as a CD. The cover includes a flexible and transparent base portion for covering one side of the optical disk. A first retaining portion is affixed to the top of the base portion so as to define a pocket for snugly receiving and frictionally retaining a portion of an optical disk. A second retaining portion is affixed to the top of the base portion at a distance from the first retaining portion. The second retaining portion defines another pocket for receiving and retaining another portion of the optical disk. Since the cover is transparent and snugly receives the optical disk, digitally encoded data may be readily obtained from the optical disk with conventional equipment, like a CD player, while the cover is positioned over the disk.

16 Claims, 2 Drawing Sheets

COMPACT DISK COVER

FIELD OF THE INVENTION

The present invention relates generally to a special receptacle or package and, in particular, to a protective cover for a machine readable recording medium such as an optical disk.

BACKGROUND OF THE INVENTION

Optical disks are thin, circular plates bearing digitally encoded audio, video or other data which may be read with a laser. Data is recorded on such disks in the form of a binary code as a series of 0s and 1s. This is done by forming pits along spiral tracks on a circular piece of transparent plastic, overlaying this with a reflective coating, and then covering this coating with a protective layer. An optical disk formed in this manner is relatively durable but may be scratched or smudged if mishandled.

During use of an optical disk, light from a semiconductor laser is focused onto the pits from below and the reflected light, picked up by a photodetector, converts the presence or absence of pits into a binary electrical signal. With the light focused at the level of the pits, the surface of the transparent disk is well out of focus; hence the presence of some dust, finger marks or minor scratches on the surface is so blurred as not to affect the detection process. Nevertheless, if surface of the disk becomes significantly damaged, data can be permanently lost.

One type of optical disks, referred to as compact disks or CDs, carrying encoded music have become widely popular since the mid-1980s. Today, CDs are typically marketed and stored in rectangular "jewel" boxes having hinged lids. While adequate in protecting a CD while not is use, these jewel boxes offer no protection to the CD when such is removed therefrom. Of course, it is while a CD is being transferred from a jewel box to a data retrieval apparatus and vice versa that a CD is most easily damaged by contact with foreign objects or the inner surfaces of the jewel box.

SUMMARY OF THE INVENTION

In light of the problems associated with the known covers for optical disks, it is a principal object of the invention to provide a protective cover for an optical disk which need not be separated from the optical disk in order for digitally encoded data to be read therefrom without loss or distortion.

It is another object of the invention to provide a protective cover of the type described which, together with an optical disk retained therein, may be inserted into conventional data retrieval apparatus, like a CD player or CD-ROM drive, without impeding the performance of the apparatus.

It is a further object of the invention to provide a protective cover which, together with an optical disk retained therein, may be stored within a conventional, jewel box.

Still another object of the invention is to provide a cover for an optical disk which may be easily positioned on an optical disk for use.

It is an object of the invention to provide improved elements and arrangements thereof in a protective cover for an optical disk or CD for the purposes described which is lightweight in construction, inexpensive in manufacture, and dependable in use.

Briefly, the protective cover in accordance with this invention achieves the intended objects by featuring a circular base portion having a peripheral edge with a diameter substantially equal to that of a selected optical disk and a central opening sized no smaller than the center hole of the optical disk. A first retaining portion is affixed to the top of the base portion so as to define a pocket. A second retaining portion is affixed to the top of the base portion opposite the first retaining portion so as to define another pocket. In use, an optical disk can be fitted into and frictionally retained within the opposed pockets.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENT

Figure 1:
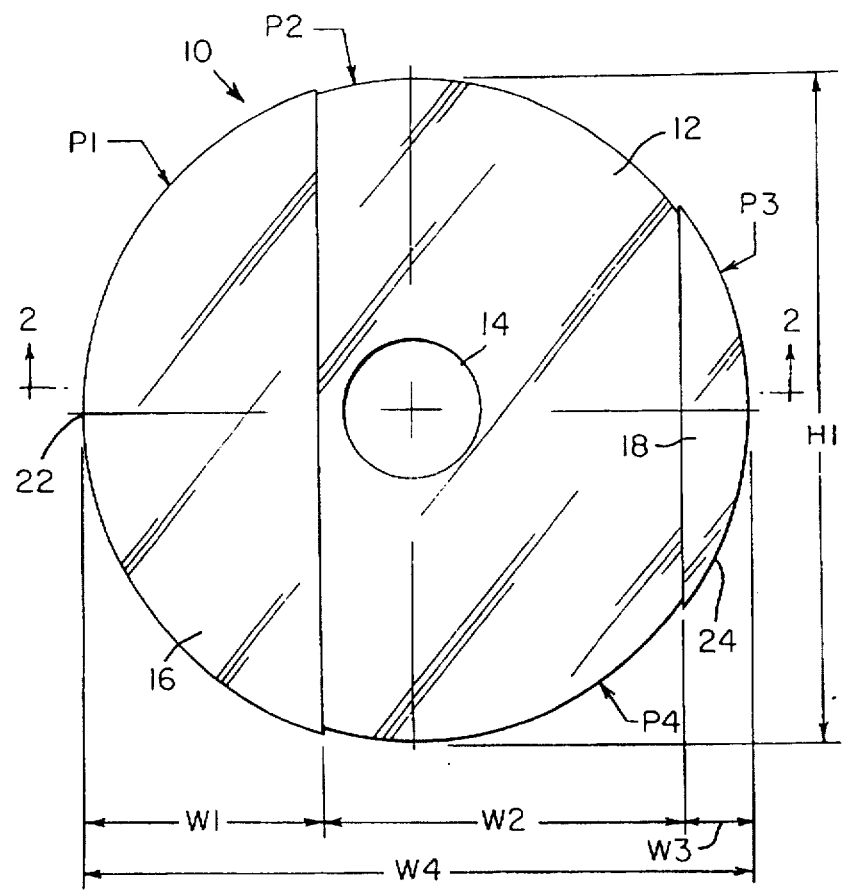
FIG. 1 is a top plan view of a compact disk cover in accordance with the present invention.
Figure 2:
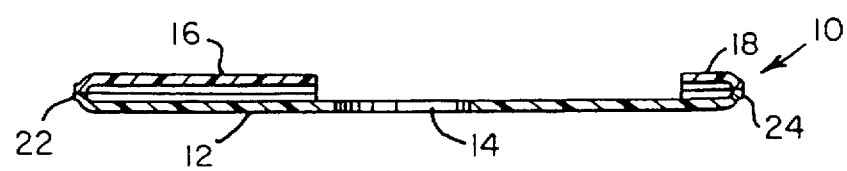
FIG. 2 is a cross-sectional view taken along line 2—2 of FIG. 1.

Referring now to the FIGS., a compact disk cover in accordance with the present invention is shown at 10. The cover 10 includes a circular base portion 12 having a central opening 14 of circular outline. A pair of semicircular retaining portions 16 and 18 are secured to the upper surface of the base portion 12 on opposite sides of the central opening 14 so as to form pockets into which a compact disk or CD 20 may be snugly received and retained.

The base portion 12 comprises a flexible sheet of transparent plastic, such as polypropylene, about two mils (0.05 mm) thick which is capable of transmitting laser light to and from the CD 20 so that digitally encoded data can be retrieved from the CD. Preferably, the same material employed to construct the base portion 12 is also used to form the semicircular portions 16 and 18. Problems related to differential shrinkage and stretching of the portions 12, 16 and 18 during manufacture and use can, thus, be avoided.

Portions 12, 16 and 18 are dimensioned to ensure a snug fit with CD 20 having a diameter of four and three-quarter inches (12 cm) and a thickness of about one-sixteenth of an inch (1.59 mm). Preferably, the portion 16 has a width W1 of one and twenty-five thirty-secondths of an inch (4.52 cm) and a peripheral edge P1 with a two and thirteen thirty-secondths of an inch (6.11 cm) radius of curvature. The portion 18, however, has a width W3 of thirteen thirty-secondths of an inch (1.03 cm) and a peripheral edge P3 with a radius of curvature of two and thirteen thirty-secondths of an inch (6.11 cm). In the two and five-eighths inch (6.67 cm) gap W2 between the portions 16 and 18, the portion 12 has opposed peripheral edges P2 and P4 each with a two and three-eighths inch (6.03 cm) radius of curvature. Adjacent the portions 16 and 18, the peripheral edges of the base portion 12 have a two and thirteen thirty-secondths of an inch (6.11 cm) radius of curvature to match that of the portions 16 and 18. Thus, the preferred width W4 of the portion 12, measuring four and thirteen-sixteenths of an inch (12.22 cm), is slightly greater than the preferred height H1 thereof, measuring four and three-quarters inches (12 cm).

The cover 10 may be made with conventional equipment in a continuous production process. Initially, the plastic material which is to form the base portion 12 is fed from a first roll (not shown). As the plastic material is advanced from the first roll, the plastic material which is to form the semicircular portions 16 and 18 is fed, respectively, from second and third rolls (not shown) spaced about two and five-eighths of an inch (6.67 cm) apart and brought into engagement with the plastic material which is to form the portion 12. By means of a heat sealing element (not shown), the peripheral edges P1 and P3 of the semicircular portions 16 and 18 are affixed to the base portion 12. After this operation has been completed, the cover 10 is then die cut to shape and is severed from any selvage. The resulting cover 10 includes the opening 14 having a diameter of about one inch (2.54 cm) and heat-sealed flanges 22 and 24, where the semicircular portions 16 and 18 are bonded to the base portion 12. The width of each of the flanges 22 and 24 is about two mil (0.05 mm).

Figure 3:
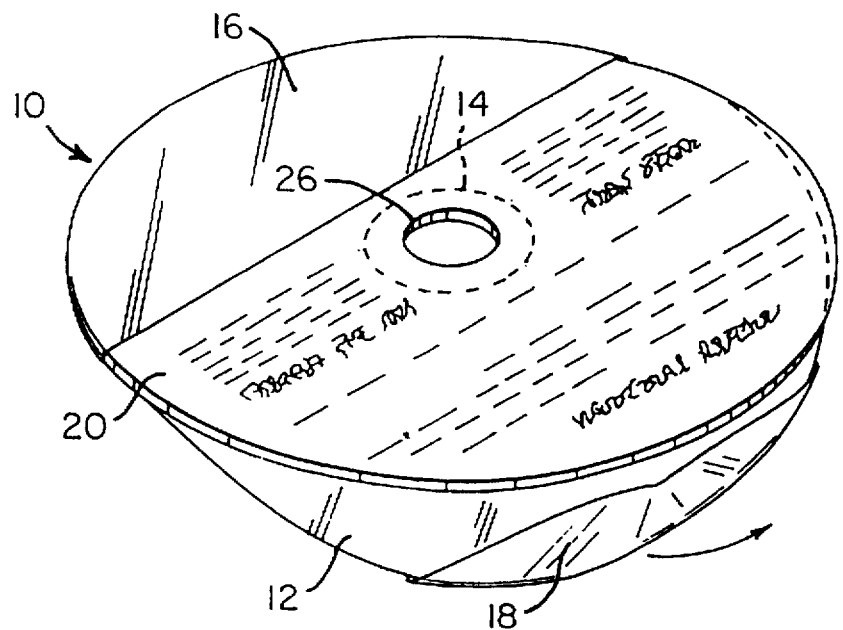
FIG. 3 is a perspective view of the cover shown partially positioned on a compact disk.

Positioning the CD 20 within the cover 10 is easily accomplished. As shown in FIG. 3, the CD 20 is first partially positioned within the cover 10 by moving the semicircular portion 18 downwardly relative to the semicircular portion 16. Then, with the machine-readable side of CD 20 positioned adjacent the base portion 12, the CD is inserted into the relatively large pocket formed between the semicircular portion 16 and the base portion. Next, the semicircular portion 18 is distorted slightly to form a relatively small, open pocket with the base portion 12. Finally, the semicircular portion 18 is rotated upwardly to receive the adjacent part of the CD 20 in the relatively small pocket.

Figure 4:
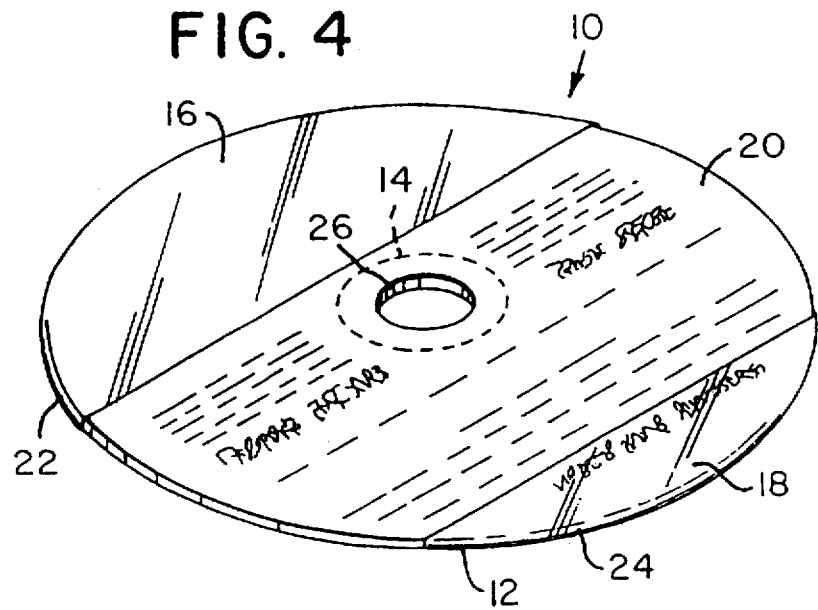
FIG. 4 is a perspective view of the cover fully positioned on a compact disk.

Since the cover 10 is transparent and fits snugly upon the CD 20 as shown in FIG. 4, digitally encoded data can be retrieved from the CD with the cover in place. To permit the CD 20 to be rotated by conventional playing equipment, the opening 14 in the base portion 12 corresponds in position with the spindle-receiving hole 26 in the CD 20. After retrieving data from the CD 20 protected by the cover 10, the CD and cover together may be positioned in a jewel box (not shown) for later use. Should the cover 10 ever become soiled or scratched, it may be easily removed from the CD 20 by reversing the inserting procedure described hereinabove. The cover 10 may then be discarded and conveniently replaced. The useful life of the CD 20 may, thus, be significantly increased.

While the invention has been described with a high degree of particularity, it will be appreciated by those skilled in the art that numerous modifications and substitutions may be made thereto. For example, the relative dimensions of the portions 12, 16 and 18 may be varied as necessary to accommodate optical disks having dimensions different than those of CD 20. Therefore, it is to be understood that the present invention is not limited to the sole embodiment described above, but encompasses any and all embodiments within the scope of the following claims.

I claim:

1. A cover for an optical disk having a center hole, comprising:

a circular base portion having a peripheral edge with a diameter substantially equal to that of the optical disk;

a first retaining portion located atop said circular base portion and affixed to the peripheral edge thereof so as to define a pocket between said first retaining portion and said circular base portion for receiving and retaining a portion of the optical disk; and, a second retaining portion located atop said circular base portion and spaced from said first retaining portion, said second retaining portion being affixed to the peripheral edge of said base portion so as to define a pocket between said second retaining portion and said base portion for receiving and retaining another portion of the optical disk.

2. The optical disk cover according to claim 1 wherein said first retaining portion has a greater lateral extent than said second retaining portion.

3. The optical disk cover according to claim 1 wherein said circular base portion is formed from transparent plastic.

4. The optical disk cover according to claim 3 wherein said first retaining portion and said second retaining portion are formed of transparent plastic.

5. The optical disk cover according to claim 4 wherein said first retaining portion and said second retaining portion are affixed, respectively, to said circular base portion by a heat-sealed flange.

6. The optical disk cover according to claim 1 wherein said circular base portion has a center opening dimensioned no smaller than the center hole of the optical disk.

7. The optical disk cover according to claim 6 wherein said first retaining portion and said second retaining portion are spaced from said center opening.

8. A protective cover for an optical disk having a center hole, said protective cover comprising:

a base portion formed of a relatively thin, flexible and transparent material, said base portion having a peripheral edge with a diameter substantially the same as that of the optical disk, said base portion further having a center opening dimensioned no smaller than the center hole of the optical disk;

a first semicircular retaining portion formed of a relatively thin and flexible material, said first semicircular retaining portion being located atop said base portion and spaced from said center opening, said first semicircular retaining portion also being affixed to the peripheral edge of said base portion so as to define a pocket between said first semicircular retaining portion and said base portion for snugly receiving and frictionally retaining part of the optical disk; and, a second semicircular retaining portion formed of a relatively thin and flexible material, said second semicircular retaining portion being located atop said base portion and spaced from said first semicircular retaining portion, said second semicircular retaining portion being affixed to the peripheral edge of said base portion so as to define a pocket between said second semicircular retaining portion and said base portion for snugly receiving and frictionally retaining another part of the optical disk.

9. The optical disk cover according to claim 8 wherein said first semicircular retaining portion has a greater lateral extent than said second semicircular retaining portion.

10. The protective cover according to claim 8 wherein said base portion, said first semicircular retaining portion and said second semicircular retaining portion are respectively formed of a thermoplastic material.

11. The protective cover according to claim 10 wherein said first semicircular retaining portion and said second semicircular retaining portion are affixed, respectively, to said base portion by a heat-sealed flange.

12. The protective cover according to claim 10 wherein said first semicircular retaining portion and said second semicircular retaining portion are located on opposite sides of said center opening.

13. A protective cover for an optical disk having a center hole, said protective cover comprising:

a base portion sized to substantially cover the bottom of the optical disk and formed of a flexible and transparent plastic composition, said base portion having a peripheral edge and a center opening dimensioned no smaller than the center hole of the optical disk;

a first retaining portion formed of a flexible and transparent plastic composition, said first retaining portion being located atop said base portion and spaced from said center opening, said first retaining portion having a first semicircular edge affixed to the peripheral edge of said base portion so as to define a pocket between said first retaining portion and said base portion for snugly receiving and frictionally retaining part of the optical disk; and, a second retaining portion formed of a flexible and transparent plastic composition, said second retaining portion being located atop said base portion and spaced from said first retaining portion, said second retaining portion having a second semicircular edge affixed to the peripheral edge of said base portion so as to define a pocket between said second retaining portion and said base portion for snugly receiving and frictionally retaining another part of the optical disk.

14. The optical disk cover according to claim 13 wherein said first retaining portion has a greater lateral extent than said second retaining portion.

15. The protective cover according to claim 13 wherein said first semicircular edge and said second semicircular edge are affixed, respectively, to said base portion by a heat-sealed flange.

16. The protective cover according to claim 13 wherein said first retaining portion and said second retaining portion are located on opposite sides of said center opening.

* * * * *